United States Patent
Moreira et al.

(10) Patent No.: US 12,516,987 B2
(45) Date of Patent: Jan. 6, 2026

(54) NON-UNIFORMITY CORRECTION CALIBRATIONS IN INFRARED IMAGING SYSTEMS AND METHODS

(71) Applicant: Teledyne FLIR Commercial Systems, Inc., Goleta, CA (US)

(72) Inventors: Julie R. Moreira, Santa Barbara, CA (US); Theodore R. Hoelter, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 723 days.

(21) Appl. No.: 17/886,368

(22) Filed: Aug. 11, 2022

(65) Prior Publication Data
US 2023/0048442 A1  Feb. 16, 2023

Related U.S. Application Data

(60) Provisional application No. 63/233,184, filed on Aug. 13, 2021, provisional application No. 63/233,193, filed on Aug. 13, 2021.

(51) Int. Cl.
*G01J 5/80* (2022.01)
*G06T 7/80* (2017.01)
(Continued)

(52) U.S. Cl.
CPC ............... *G01J 5/80* (2022.01); *G06T 7/80* (2017.01); *H04N 5/33* (2013.01); *H04N 25/53* (2023.01);
(Continued)

(58) Field of Classification Search
CPC ...................................................... H04N 25/63
See application file for complete search history.

(56) References Cited

U.S. PATENT DOCUMENTS 7,634,157 B1 * 12/2009 Richards ............ G01J 3/32
  382/284
8,760,509 B2   6/2014 Schmidt et al.
(Continued)

FOREIGN PATENT DOCUMENTS

CN  103604503 A  2/2014

OTHER PUBLICATIONS

Chang et al., "Single-reference-based solution for two-point nonuniformity correction of infrared focal plane arrays", Infrared Physics & Technology, Sep. 2019, pp. 96-104, vol. 101, Elsevier B.V., Changchun, China, Abstract.
(Continued)

*Primary Examiner* — Jerry T Jean Baptiste
(74) *Attorney, Agent, or Firm* — Haynes and Boone, LLP

(57) ABSTRACT

Techniques for facilitating non-uniformity correction calibrations are provided. In one example, an infrared imaging system includes an infrared imager and a logic device. The infrared imager is configured to capture a first set of infrared images of a reference object using a first integration time. The infrared imager is further configured to capture a second set of infrared images of the reference object using a second integration time different from the first integration time. The logic device is configured to determine a dark current correction map based on the second set of infrared images. The logic device is further configured to generate a non-uniformity correction map based on the dark current correction map. Related devices and methods are also provided.

20 Claims, 4 Drawing Sheets

(51) Int. Cl.
    *H04N 5/33*      (2023.01)
    *H04N 25/53*     (2023.01)
    *H04N 25/63*     (2023.01)
    *H04N 25/671*    (2023.01)
    *G01J 5/00*      (2022.01)

(52) U.S. Cl.
    CPC ........... *H04N 25/63* (2023.01); *H04N 25/671* (2023.01); *G01J 2005/0077* (2013.01); *G01J 2005/0092* (2013.01)

(56) References Cited

U.S. PATENT DOCUMENTS

2009/0273675 A1    11/2009  Jonsson
2016/0065848 A1     3/2016  LeBeau et al.
2022/0353402 A1*   11/2022  Winzell ................ H04N 25/76

OTHER PUBLICATIONS

Caner Calik et al., "A Study on Calibration Methods for Infrared Focal Plane Array Cameras", In Proceedings of the 13th International Joint Conference on Computer Vision Imaging and Computer Graphics Theory and Applications (VISIGRAPP 2018)—vol. 4: VISAPP, Jan. 27, 2018, pp. 219-226, ScitePress, Madeira, Portugal.
Chen et al., "Nonuniformity Correction for Variable-Integration-Time Infrared Camera" IEEE Photonics Journal; Dec. 2018, 12 pages, vol. 10, No. 6, IEEE, New Jersey, United States of America.
Kumar, Ajay, "Sensor Non Uniformity Correction Algorithms and its Real Time Implementation;" Defence Science Journal, Nov. 2013, pp. 589-598, vol. 63, No. 6, DESIDOC, Dehradun, India.

* cited by examiner

NON-UNIFORMITY CORRECTION CALIBRATIONS IN INFRARED IMAGING SYSTEMS AND METHODS

CROSS REFERENCE TO RELATED APPLICATIONS

This application claims priority to and the benefit of U.S. Provisional Patent Application No. 63/233,184 filed Aug. 13, 2021 and entitled "NON-UNIFORMITY CORRECTION CALIBRATIONS IN INFRARED IMAGING SYSTEMS AND METHODS," and U.S. Provisional Patent Application No. 63/233,193 filed Aug. 13, 2021 and entitled "NON-UNIFORMITY CORRECTION CALIBRATIONS IN INFRARED IMAGING SYSTEMS AND METHODS," which are incorporated herein by reference in their entireties.

TECHNICAL FIELD

One or more embodiments relate generally to imaging and more particularly, for example, to non-uniformity correction (NUC) calibrations in infrared imaging systems and methods.

BACKGROUND

Imaging systems may include an array of detectors arranged in rows and columns, with each detector functioning as a pixel to produce a portion of a two-dimensional image. For example, an individual detector of the array of detectors captures an associated pixel value. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an infrared imaging system includes an infrared imager and a logic device. The infrared imager is configured to capture a first set of infrared images of a reference object using a first integration time. The infrared imager is further configured to capture a second set of infrared images of the reference object using a second integration time different from the first integration time. The logic device is configured to determine a dark current correction map based on the second set of infrared images. The logic device is further configured to generate a non-uniformity correction map based on the dark current correction map.

In one or more embodiments, a method includes capturing, by an imager of an imaging device, a first set of infrared images of a reference object using a first integration time. The method further includes capturing, by the imager, a second set of infrared images of the reference object using a second integration time different from the first integration time. The method further includes determining a dark current correction map based on the second set of infrared images. The method further includes generating a non-uniformity correction map based on the dark current correction map.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
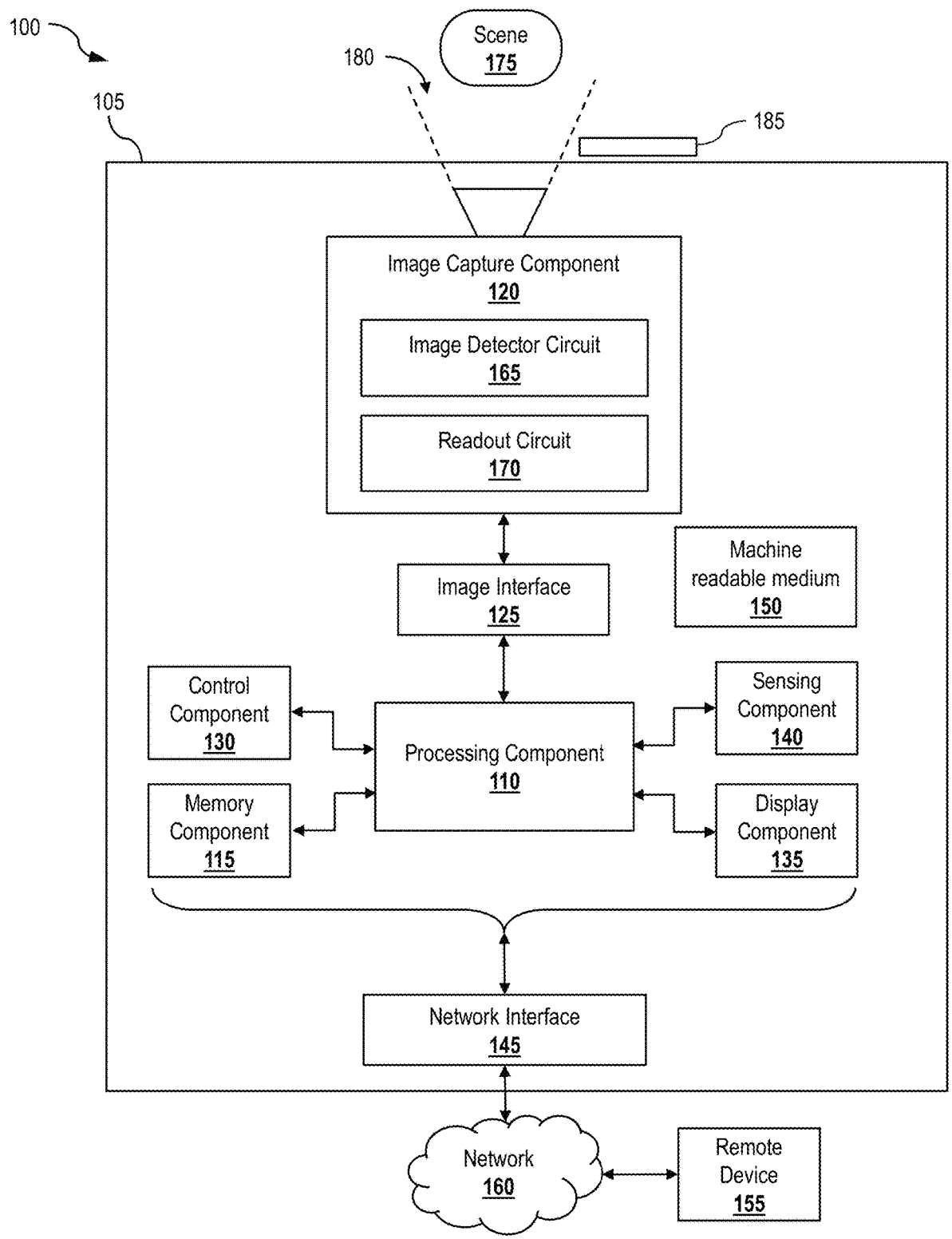
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate calibrations related to non-uniformity correction (NUC) in infrared imaging systems and methods. An infrared imaging system (e.g., a thermal camera) may be used to capture infrared image data associated with a scene using an image sensor device (e.g., a detector array of an FPA). The image sensor device includes detectors (e.g., also referred to as detector pixels, detector elements, or simply pixels). Each detector pixel may detect incident EM radiation and generate infrared image data indicative of the detected EM radiation of the scene. In some embodiments, the image sensor array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C. As such, the captured infrared image data may indicate or may be used to determine a temperature of objects, persons, and/or other features/aspects in the scene.

In some embodiments, the image sensor device may be calibrated (e.g., factory calibrated) to determine non-uniformity correction terms (e.g., including gain correction terms and offset correction terms) and, at a later time, update these non-uniformity correction terms. Such calibrations may capture images of reference objects (e.g., high temperature object, low temperature object, shutter, or generally any object having a known temperature) using one or more integration times. Such calibrations involving different reference objects and/or different integration times may mitigate instability occurring in infrared detectors (e.g., thermal infrared detectors such as mid-wave infrared detectors and/or long-wave infrared detectors). In some aspects, such calibrations may mitigate instability even for thermal infrared detectors operated at higher/high operating temperatures (e.g., relative to detectors operating at around liquid-nitrogen temperatures such as 80 K). As an example, such high operating temperature detectors may have operating temperatures greater than 120 K, such as in a range between 120 K and 150 K. In some cases, if not mitigated, such instability may prevent static, factory non-uniformity corrections containing gain and offset maps (e.g., gain and offset terms per pixel) from being effective for fixed pattern noise reduction (e.g., over time).

The image sensor device may be calibrated (e.g., factory calibrated) using two sources to obtain NUC terms. Such a calibration may achieve two different flux levels using two different temperatures. In an aspect, such calibration may be referred to as a two-source NUC calibration or two-temperature NUC calibration or simply a two-source calibration or two-temperature calibration. The two different temperatures may be from two temperature sources. Images and/or parameters derived from the images may be captured of each of the temperature sources. In an aspect, images of the same temperature source may be captured using different integration times. A user of the image sensor device may perform such a calibration with desired preset settings (e.g., integration time, sync mode, windowing, image orientation, blackbody flood sources of two different temperatures). Various temperature maps and/or parameters derived therefrom, such as integration times, may be used to determine NUC maps, such as gain maps, offset maps, and/or bad pixel maps. The various temperature maps, NUC maps, integration times, and/or other parameters determined or derivable from the two-source calibration may be stored (e.g., in non-volatile memory) for use in subsequent calibrations, such as subsequent calibrations performed using a single source. In some cases, various new terms and maps may be stored (e.g., in non-volatile memory) and used (e.g., only used) in dark current correction computation during a one-source NUC calibration, as further discussed herein. In an aspect, since the two-source calibration involves adjusting the integration time, the two-source calibration may be referred to as an integration time adjustment two-source calibration.

The image sensor device may subsequently be calibrated using a single source to update the NUC terms. In an aspect, such calibration may be referred to as a single-source NUC calibration or one-source NUC calibration or simply a single-source calibration or one-source calibration. According to one or more aspects, such a calibration may be performed to update the NUC terms (e.g., gain maps and offset maps) using a single temperature source, thus allowing updates to be determined in-the-field/on-the-fly in various camera designs (e.g., which typically have available only a single temperature source in run-time operation) without using two temperatures. In some cases, the single temperature source may be a shutter of the imaging system (e.g., an integrated shutter available as part of a mechanical design of the imaging system) that may be used to selectively block radiation from reaching the image sensor device. In some cases, the single temperature source may be an external source/object to selectively block radiation from reaching the image sensor device. An external source/object may be referred to as, or referred to as providing, an external shutter or a virtual shutter. By way of non-limiting examples, the external source/object may include a case or holster of the imaging system, a lens cap, a cover, a wall of a room, or other suitable object/surface. In some cases, such a calibration achieves two different flux levels from a single temperature source by using two different integration times.

In some aspects, calibration using the two sources may be performed at the factory (e.g., as part of a manufacturing process prior to delivery to a customer), whereas run-time/in-the-field calibration using a single source may be performed (e.g., by an operator of the image sensor device) to adjust/update the factory calibrated and tested NUC terms (e.g., gain and offset maps). In this regard, in some cases, the two-source calibration may be performed as a one-time calibration. The various temperature maps, NUC maps, integration times, and/or other parameters determined during the one-source calibration may be stored (e.g., in volatile memory) for use in calibration-related computations and/or image processing/correction computations. In an aspect, similar to the two-source calibration, since the one-source calibration involves adjusting the integration time, the one-source calibration may be referred to as an integration time adjustment one-source calibration.

In some aspects, to facilitate accurate gain update, an integrated dark current difference between integration times may be determined during the one-source calibration using parameters obtained during the two-source calibration (e.g., at the factory prior to deployment of the imaging system) and then processed (e.g., scaled) for the integration time used during the gain update (e.g., when deployed) to account for varying of the temperature of the single source. In this regard, a dark current correction map may be determined from both static terms and dynamic terms. The static terms may include, or may be derived from, maps and parameters generated during the calibration involving two temperatures (e.g., two temperature sources). In some cases, the static terms are stored in non-volatile memory (e.g., of or otherwise accessible to the imaging system). The dynamic term may include an integration time used in the calibration involving one source (e.g., the shutter or external source), which is associated with scaling of the dark current correction as further described herein. The dark current map may be re-calculated each time a one-source calibration is applied due to variation in the integration time resulting from variation in the temperature of the single source. In some cases, dynamic integration time logic (e.g., implemented by a logic device of the imaging system) may allow a temperature of the single source to vary while ensuring the integration time adjustment provides a sufficient signal swing while not allowing saturation. In some cases, image captures with the two temperatures may occur in a user's desired operational mode. In some cases, image captures with two integration times against the same temperature may occur in an integrate-then-read (ITR) mode. Image captures using the ITR mode may reduce/remove readout related artifacts.

Although various embodiments for calibration are described primarily with respect to infrared imaging, calibration using methods and systems disclosed herein may be utilized in conjunction with devices and systems such as infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing (e.g., a camera body) that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging device 105 includes, according to one implementation, a logic device 110, a memory component 115, an image capture component 120 (e.g., an imager, an image sensor device), an image interface 125, a control component 130, a display component 135, a sensing component 140, and/or a network interface 145. The logic device 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 110 may be configured, by hardwiring, executing software instructions, or a combination of both, to perform various operations discussed herein for embodiments of the disclosure. The logic device 110 may be configured to interface and communicate with the various other components (e.g., 115, 120, 125, 130, 135, 140, 145, etc.) of the imaging system 100 to perform such operations. For example, the logic device 110 may be configured to process captured image data received from the imaging capture component 120, store the image data in the memory component 115, and/or retrieve stored image data from the memory component 115. In one aspect, the logic device 110 may be configured to perform various system control operations (e.g., to control communications and operations of various components of the imaging system 100) and other image processing operations (e.g., debayering, sharpening, color correction, offset correction, bad pixel replacement, data conversion, data transformation, data compression, video analytics, etc.).

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 110 may be configured to execute software instructions stored in the memory component 115 so as to perform method and process steps and/or operations. The logic device 110 and/or the image interface 125 may be configured to store in the memory component 115 images or digital image data captured by the image capture component 120. In some embodiments, the memory component 115 may include non-volatile memory to store various temperature maps, NUC maps, integration times, and/or other parameters determined or derivable from a two-source calibration and/or a one-source calibration. In some embodiments, the memory component 115 may include volatile memory to store various temperature maps, NUC maps, integration times, and/or other parameters determined or derivable from a one-source calibration.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the logic device 110, with code (e.g., software or configuration data) for the modules stored, for example, in the memory component 115.

The imaging device 105 may be a video and/or still camera to capture and process images and/or videos of a scene 175. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) received through an aperture 180 of the imaging device 105 and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 175. In another example, the detector output image may be a visible-light image.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the logic device 110 that processes the detected image data as read out by the readout circuit 170, with communication of data from the readout circuit 170 to the logic device 110 facilitated by the image interface 125. An image capturing frame rate may refer to the rate (e.g., detector output images per second) at which images are detected/output in a sequence by the image detector circuit 165 and provided to the logic device 110 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 120 may include one or more optical components and/or one or more filters. The optical component(s) may include one or more windows, lenses, mirrors, beamsplitters, beam couplers, and/or other components to direct and/or focus radiation to the image detector circuit 165. The optical component(s) may include components each formed of material and appropriately arranged according to desired transmission characteristics, such as desired transmission wavelengths and/or ray transfer matrix characteristics. The filter(s) may be adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 120 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

In some embodiments, the imaging system 100 includes a shutter 185. The shutter 185 may be operated to selectively inserted into an optical path between the scene 175 and the image capture component 120 to expose or block the aperture 180. In some cases, the shutter 185 may be moved (e.g., slid, rotated, etc.) manually (e.g., by a user of the imaging system 100) and/or via an actuator (e.g., controllable by the logic device 110 in response to user input or autonomously, such as an autonomous decision by the logic device 110 to perform a calibration of the imaging device 105). When the shutter 185 is outside of the optical path to expose the aperture 180, the electromagnetic radiation from the scene 175 may be received by the image detector circuit 165 (e.g., via one or more optical components and/or one or more filters). As such, the image detector circuit 165 captures images of the scene 175. The shutter 185 may be referred to as being in an open position or simply as being open. When the shutter 185 is inserted into the optical path to block the aperture 180, the electromagnetic radiation from the scene 175 is blocked from the image detector circuit 165. As such, the image detector circuit 165 captures images of the shutter 185. The shutter 185 may be referred to as being in a closed position or simply as being closed. In some cases, the shutter 185 may block the aperture 180 during a calibration process, in which the shutter 185 may be used as a uniform blackbody (e.g., a substantially uniform blackbody). For example, the shutter 185 may be used as a single temperature source or substantially single temperature source. In some cases, the shutter 185 may be temperature controlled to provide a temperature controlled uniform black body (e.g., to present a uniform field of radiation to the image detector circuit 165). For example, in some cases, a surface of the shutter 185 imaged by the image detector circuit 165 may be implemented by a uniform blackbody coating. In some cases, such as for an imaging device without a shutter or with a broken shutter or as an alternative to the shutter 185, a case or holster of the imaging device 105, a lens cap, a cover, a wall of a room, or other suitable object/surface may be used to provide a uniform blackbody (e.g., substantially uniform blackbody) and/or a single temperature source (e.g., substantially single temperature source). Thus, for example, the shutter 185 may be used with the image capture component 120 to a perform a NUC process, such as a flat field correction (FFC) process set forth in U.S. patent application Ser. No. 12/391,156 filed Feb. 23, 2009, which is incorporated herein by reference in its entirety.

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the logic device 110. In this regard, the received images or image data may be converted into signals or data suitable for processing by the logic device 110. For example, in one embodiment, the image interface 125 may be configured to receive analog video data and convert it into suitable digital data to be provided to the logic device 110.

The image interface 125 may include various standard video ports, which may be connected to a video player, a video camera, or other devices capable of generating standard video signals, and may convert the received video signals into digital video/image data suitable for processing by the logic device 110. In some embodiments, the image interface 125 may also be configured to interface with and receive images (e.g., image data) from the image capture component 120. In other embodiments, the image capture component 120 may interface directly with the logic device 110.

The control component 130 includes, in one embodiment, a user input and/or an interface device, such as a rotatable knob (e.g., potentiometer), push buttons, slide bar, keyboard, and/or other devices, that is adapted to generate a user input control signal. The logic device 110 may be configured to sense control input signals from a user via the control component 130 and respond to any sensed control input signals received therefrom. The logic device 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons and/or other input mechanisms of the control unit may be used to control various functions of the imaging device 105, such as calibration initiation and/or related control, shutter control, autofocus, menu enable and selection, field of view, brightness, contrast, noise filtering, image enhancement, and/or various other features.

The display component 135 includes, in one embodiment, an image display device (e.g., a liquid crystal display (LCD)) or various other types of generally known video displays or monitors. The logic device 110 may be configured to display image data and information on the display component 135. The logic device 110 may be configured to retrieve image data and information from the memory component 115 and display any retrieved image data and information on the display component 135. The display component 135 may include display circuitry, which may be utilized by the logic device 110 to display image data and information. The display component 135 may be adapted to receive image data and information directly from the image capture component 120, logic device 110, and/or image interface 125, or the image data and information may be transferred from the memory component 115 via the logic device 110. In some aspects, the control component 130 may be implemented as part of the display component 135. For example, a touchscreen of the imaging device 105 may provide both the control component 130 (e.g., for receiving user input via taps and/or other gestures) and the display component 135 of the imaging device 105.

The sensing component 140 includes, in one embodiment, one or more sensors of various types, depending on the application or implementation requirements, as would be understood by one skilled in the art. Sensors of the sensing component 140 provide data and/or information to at least the logic device 110. In one aspect, the logic device 110 may be configured to communicate with the sensing component 140. In various implementations, the sensing component 140 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the logic device 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.). The sensing component 140 may include a temperature sensing component to provide temperature data (e.g., one or more measured temperature values) various components of the imaging device 105, such as the image detection circuit 165 and/or the shutter 185. By way of non-limiting examples, a temperature sensor may include a thermistor, thermocouple, thermopile, pyrometer, and/or other appropriate sensor for providing temperature data.

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the logic device 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the logic device 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the logic device 110 may be combined with the memory component 115, image capture component 120, image interface 125, display component 135, sensing component 140, and/or network interface 145. In another example, the logic device 110 may be combined with the image capture component 120, such that certain functions of the logic device 110 are performed by circuitry (e.g., a processor, a microprocessor, a logic device, a microcontroller, etc.) within the image capture component 120.

Figure 2:
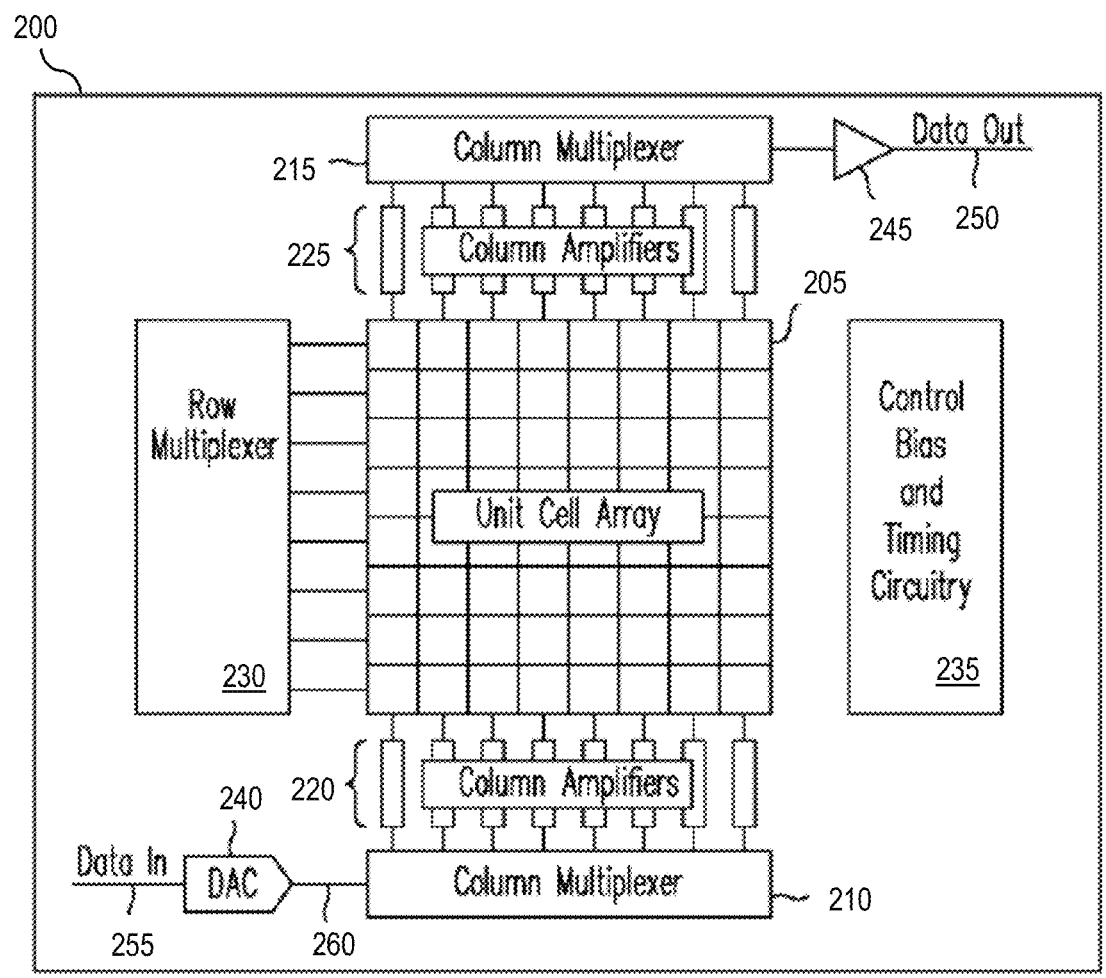
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the logic device 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the logic device 110 and/or image capture component 120 of FIG. 1.

In an embodiment, the image sensor assembly 200 may be implemented as part of an imaging device (e.g., the imaging device 105). In addition to the various components of the image sensor assembly 200, the imaging device may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

In some embodiments, two-source calibrations may be performed (e.g., in the factory) with desired preset settings (e.g., integration time, sync mode, windowing, image orientation, and black body flood sources of two different temperatures). In these two-source calibrations, as further discussed herein, maps/images $I_{highTintTSC}$ and $I_{lowTintTSC}$, highTMean$_{TSC}$ (and/or corresponding temperature map $I_{highT}$), and the integration time $T_{intTSC}$ may be determined and stored (e.g., in non-volatile memory). Determination and storage of such two-source calibration results according to embodiments herein may facilitate subsequent calibrations using a single source to adjust/update NUC terms to allow for effective correction (e.g., fixed pattern noise reduction) over time (e.g., relative to conventional approaches in which a standard gain map, offset map, and bad pixel map are generated based primarily/solely on a single hot scene map and/or a single cold scene map).

Figure 3:
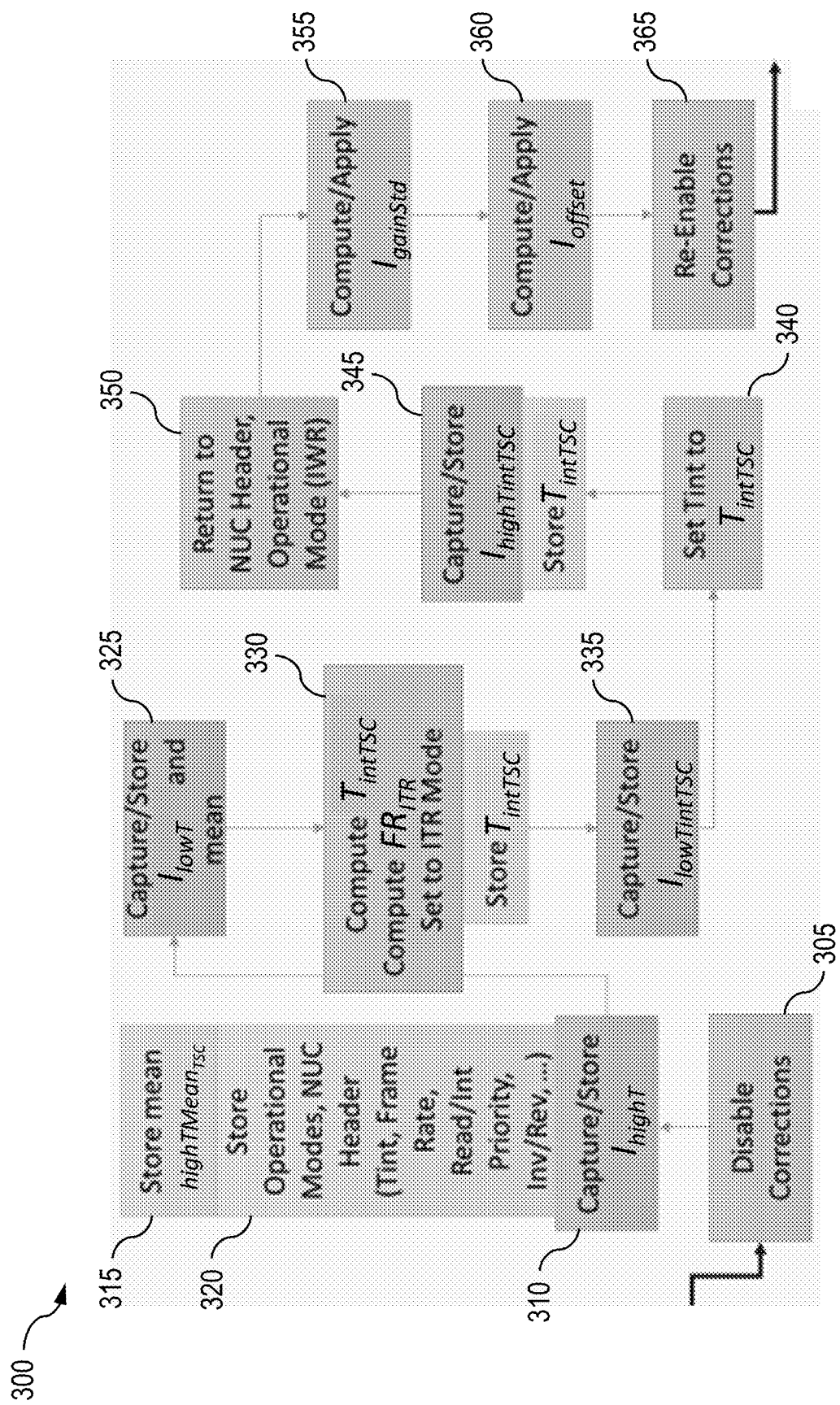
FIG. 3 illustrates a flow diagram of an example process for facilitating calibration using two sources in accordance with one or more embodiments of the present disclosure.

FIG. 3 illustrates a flow diagram of an example process 300 for facilitating calibration using two sources in accordance with one or more embodiments of the present disclosure. Although the process 300 is primarily described herein with reference to the imaging system 100 of FIG. 1 for explanatory purposes, the process 300 can be performed in relation to other systems for facilitating calibration. Note that one or more operations in FIG. 3 may be combined, omitted, and/or performed in a different order as desired. In some cases, the operations shown in FIG. 3 may be performed at the factory (e.g., as part of factory calibration).

At block 305, a calibration is initiated. With calibration initiated, non-uniformity corrections according to current NUC parameters may be disabled. In some cases, with calibration initiated, the imaging device 105 (e.g., the logic device 110) disables some or all processing performed by an image processing pipeline. In some embodiments, the operation may be initiated (e.g., user-initiated as part of a manufacturing process). The calibration may be initiated by a user operating the control component 130 of the imaging device 105.

At block 310, the imaging device 105 (e.g., the image capture component 120) captures an image $I_{highT}$ associated with a high temperature source (e.g., also referred to as a high temperature scene, high temperature object, hot source, hot reference source, or variations thereof). In some aspects, block 310 may be implemented as follows to capture the image $I_{highT}$.

The high temperature source may be provided (e.g., positioned) in a field of view of the imaging device 105 (e.g., the image detector circuit 165 of the imaging device 105). In some cases, the display component 135 of the imaging device 105 may prompt a user of the imaging device 105 to provide the high temperature source. For example, the prompt may indicate to the user to place the high temperature source at a location such that an entirety of the field of view of the imaging device 105 encompasses the high temperature source. The high temperature source may be/provide a high temperature uniform source (e.g., a high temperature uniform black body). The high temperature source may generally be any source having a known temperature (e.g., accurately measured temperature). The temperature of the high temperature source may be at an upper end of a detector input range of detectors of the image detector circuit 165. In some cases, the temperature of the high temperature source may be selected based on application of the imaging device 105 (e.g., desired temperature or temperature range of scenes to be accurately captured by the imaging device 105).

The imaging device 105 (e.g., the image capture component 120) may capture a set of images (e.g., one or more thermal images) of the high temperature source. The image(s) may be captured using the integration time value $T_{intCurrNUC}$ for a current preset/NUC table. The integration time value $T_{intCurrNUC}$ may be referred to as a NUC table integration time. The image $I_{highT}$ may provide a temperature map associated with the high temperature source. In a case that multiple images (e.g., a sequence of images) are captured, the imaging device 105 (e.g., the logic device 110) may generate the image $I_{highT}$ by averaging the captured images. The image $I_{highT}$ may be referred to as an average image or an average frame associated with the high temperature source. A pixel (i,j) of the image $I_{highT}$ may be denoted as $I_{highT}(i,j)$ or $I_{highTi,j}$. Other images and maps described herein may be similarly denoted. For example, a pixel (i,j) of each of the captured images may be averaged to determine a corresponding pixel (i, j) of the image $I_{highT}$, in which $0 \leq i \leq M-1$ and $0 \leq j \leq N-1$ where M is the number of rows of the image $I_{highT}$ and N is the number of columns of the image $I_{highT}$ (or equivalently the number of rows of detectors and the number of columns of detectors, respectively, of the image detector circuit 165). In some cases, one or more pixel values from one or more captured images may be ignored when determining the average value of each pixel (i,j) of the image $I_{highT}$. For example, if six images are captured at block 310 and a particular pixel of one of the images significantly differs from values associated with corresponding pixels of the remaining five images, the pixel value of the one image may skew the average pixel value if the pixel value is not ignored. In a case that a single image of the high temperature source is captured, the single image is the image $I_{highT}$. In some cases, fewer number of images captured to form the image $I_{highT}$ (or other average images) may be associated with a shorter calibration time (e.g., less time needed to accumulate the images) whereas higher number of images captured to form the image $I_{highT}$ (or other average images) may be associated with a more accurate noise reduced result.

At block 315, the imaging device 105 (e.g., the logic device 110) determines an average pixel value highT-Mean$_{TSC}$ (e.g., also denoted as mean($I_{highT}$)) by averaging the pixel values of the image $I_{highT}$, in which the subscript TSC denotes two-source calibration or two-temperature calibration. In an aspect, such an average pixel value may be referred to as an array mean or an array average. In some cases, the average pixel value highTMean$_{TSC}$ may be stored (e.g., in non-volatile memory) as a NUC header parameter. In some cases, the image $I_{highT}$ may be stored (e.g., in non-volatile memory) alternatively or in addition to storing the average pixel value highTMean$_{TSC}$.

At block 320, the imaging device 105 (e.g., the logic device 110) stores a current operational mode and NUC header parameters (e.g., integration time $T_{int}$, frame rate, read/integration priority, invert/revert, etc.). Such storage may allow the imaging device 105 to revert back to operation according to the current operational mode and the NUC header parameters after subsequent calibration steps are completed.

At block 325, the imaging device 105 (e.g., the image capture component 120) captures an image $I_{lowT}$ associated with a low temperature source (e.g., also referred to as a low temperature scene, low temperature object, cold source, cold reference source, or variations thereof). In some aspects, block 325 may be implemented as follows to capture the image $I_{lowT}$.

The low temperature source may be provided (e.g., positioned) in the field of view of the imaging device 105 (e.g., the image detector circuit 165). In some cases, similar to providing the high temperature source (e.g., at block 310), the display component 135 of the imaging device 105 may prompt a user of the imaging device 105 to provide the low temperature source. The low temperature source may be/provide a low temperature uniform source (e.g., a low temperature uniform black body). The low temperature source may generally be any source having a known temperature (e.g., accurately measured temperature). The temperature of the low temperature source may be at a lower end of the detector input range of detectors of the image detector circuit 165.

The imaging device 105 (e.g., the image capture component 120) may capture a set of images of the low temperature source. The image(s) may be captured using the integration time value $T_{intCurrNUC}$ for the current preset/NUC table. The image $I_{lowT}$ may provide a temperature map associated with the low temperature source. In a case that multiple images (e.g., a sequence of images) are captured, the imaging device 105 (e.g., the logic device 110) may generate the image $I_{lowT}$ by averaging some or all of the captured images. For example, a pixel (i,j) of each of the captured images may be averaged to determine a corresponding pixel (i,j) of the image $I_{lowT}$. The imaging device 105 (e.g., the logic device 110) determines an average pixel value lowTMean$_{TSC}$ (e.g., also denoted as mean($I_{lowT}$)) by averaging the pixel values of the image $I_{lowT}$. In some cases, the image $I_{lowT}$ and/or the average pixel value lowTMean$_{TSC}$ may be stored (e.g., in non-volatile memory).

At block 330, the imaging device 105 (e.g., the logic device 110) determines an integration time $T_{intTSC}$. The integration time $T_{intTSC}$ may be based on the integration time $T_{intCurrNUC}$, the average pixel value highTMean$_{TSC}$ associated with the high temperature source, and the average pixel value lowTMean$_{TSC}$ associated with the low temperature source. The integration time $T_{intTSC}$ may be stored (e.g., in non-volatile memory) for subsequent use by the imaging device 105. In some cases, the integration time $T_{intTSC}$ may be provided by:

$$T_{intTSC} = T_{intCurrNUC} + T_{intCurrNUC} \frac{\text{high }T\text{ Mean}_{TSC} - \text{low }T\text{ Mean}_{TSC}}{\text{low }T\text{ Mean}_{TSC} - \text{low Saturation Value}} \quad \text{Equation (1)}$$

where lowSaturationValue is a predetermined/programmable value (e.g., user-set value or default value set by a manufacturer of the imaging device 105 and/or components thereof) to define a zero point (e.g., output value in counts with no signal incident on the image detector circuit 165) of the electronics. In some cases, as shown in Equation (1), the integration time value $T_{intCurrNUC}$ is scaled based on parameters determined using the high temperature source (e.g., highTMean$_{TSC}$) and the low temperature source (e.g., lowTMean$_{TSC}$).

Further at block 330, the imaging device 105 (e.g., the logic device 110) determines a frame rate for the ITR mode, denoted as $FR_{ITR}$. In some cases, the frame rate $FR_{ITR}$ may be based on the integration time value $T_{intCurrNUC}$ relative to the integration time value $T_{intTSC}$. For example, the frame rate may be based in part on the longer of/among (e.g., the larger or the maximum of) the integration time value $T_{intCurrNUC}$ or $T_{intTSC}$. In this regard, the frame rate may be determined using the integration time value $T_{intCurrNUC}$ when $T_{intCurrNUC} > T_{intTSC}$, and the frame rate may be determined using the integration time value $T_{intTSC}$ when $T_{intTSC} > T_{intCurrNUC}$. Further at block 330, the imaging device 105 (e.g., the logic device 110) sets its components (e.g., the logic device 110 and the image capture component 120) for operation according to the ITR mode and the frame rate $FR_{ITR}$.

At block 335, the imaging device 105 (e.g., the image capture component 120) captures an image $I_{lowTintTSC}$ associated with the low temperature source according to (e.g., using) the integration time $T_{intCurrNUC}$ and the frame rate $FR_{ITR}$. In some aspects, block 335 may be implemented as follows to capture the image $I_{lowTintTSC}$. The imaging device 105 may capture a set of images of the low temperature source according to (e.g., using) the integration time $T_{intCurrNUC}$ and the frame rate $FR_{ITR}$. In a case that multiple images (e.g., a sequence of images) are captured, the imaging device 105 may generate the image $I_{lowTintTSC}$ by averaging some or all of the captured images. In a case that a single image is captured, the single image is the image $I_{lowTintTSC}$.

At block 340, the imaging device 105 (e.g., the logic device 110) sets (e.g., changes) the integration time of the image capture component 120 to the integration time $I_{intTSC}$ (e.g., determined at block 330).

At block 345, the imaging device 105 (e.g., the image capture component 120) captures an image $I_{highTintTSC}$ associated with the low temperature source according to (e.g., using) the integration time $T_{intTSC}$ and the frame rate $FR_{ITR}$. In some aspects, block 345 may be implemented as follows to capture the image $I_{highTintTSC}$. The imaging device 105 may capture one or more images of the low temperature source according to the integration time $T_{intTSC}$ and the frame rate $FR_{ITR}$. In a case that multiple images (e.g., a sequence of images) are captured, the imaging device 105 may generate the image $I_{highTintTSC}$ by averaging some or all of the captured images. In a case that a single image is captured, the single image is the image $I_{highTintTSC}$.

At block 350, the imaging device 105 reverts (e.g., is returned) to the operational mode (e.g., sync, frame rate, integration/readout priority) and the NUC header parameters stored at block 320 to return the imaging device 105 to settings used prior to block 330.

At block 355, the imaging device 105 (e.g., the logic device 110) determines a gain map $I_{gainStd}$ (e.g., also referred to as a standard gain map) formed of pixels $I_{gainStd}(i,j)$ in which $0 \le i \le M-1$ and $0 \le j \le N-1$. The gain map may be determined based on the temperature maps $I_{highT}$ and $I_{lowT}$. The gain map may be stored (e.g., in non-volatile memory).

At block 360, the imaging device 105 (e.g., the logic device 110) determines an offset map $I_{offset}$ formed of pixels $I_{offset}(i,j)$ in which $0 \le i \le M-1$ and $0 \le j \le N-1$. The offset map may be determined based on the temperature maps $I_{highT}$ and $I_{lowT}$. The offset map may be stored (e.g., in non-volatile memory). The offset map may provide offset correction terms that identify values that may be added or subtracted to pixel values for rows of pixels, columns of pixels, and/or individual pixels to reduce fixed pattern noise associated with the image capture component 120. In some cases, in addition to determining the gain map and the offset map, the imaging device 105 (e.g., the logic device 110) may determine a bad pixel map (e.g., based on the temperature maps $I_{highT}$ and $I_{lowT}$). The bad pixel map may be stored (e.g., in non-volatile memory).

At block 365, the calibration (e.g., the two-source calibration) is concluded. With calibration concluded, non-uniformity correction may be enabled. In some cases, with calibration concluded, the imaging device 105 (e.g., the logic device 110) enables processing performed by an image processing pipeline. In some embodiments, various parameters, maps, and/or other results determined during the calibration may be stored (e.g., in non-volatile memory) for use in non-uniformity correction and/or subsequent calibration processes, such as run-time (e.g., in-field) calibration processes. A subsequent calibration process may include a one-source calibration process, as further discussed herein. In this regard, various parameters, maps, and/or other results of the two-source calibration process may be used for NUC updates (e.g., gain map updates) in subsequent calibration processes. By way of non-limiting examples, the gain map $I_{gainStd}$ (e.g., determined at block 355), the offset map $I_{offset}$ (e.g., determined at block 360), the bad pixel map, the NUC header parameters, the maps/images $I_{highTintTSC}$ and $I_{lowTintTSC}$ (e.g., used in dark current correction map computations as further discussed herein), the highTMean$_{TSC}$ (and/or the corresponding temperature map $I_{highT}$), and the integration time $T_{intTSC}$.

Following block 360, the imaging device 105 may be used to capture (e.g., may return to capturing) images of the scene 175 and apply the gain map $I_{gainStd}$ and/or offset map $I_{offset}$ obtained from the calibration. In some cases, a portion of a pipeline associated with non-uniformity correction may be provided by:

$$S_{corrected}(i,j) = S_{raw}(i,j) \times I_{gain}(i,j) + I_{off}(i,j) \quad \text{Equation (2)}$$

in which $S_{raw}(i,j)$ is the signal/raw pixel value from the image capture component 120 (e.g., the FPA) without any image processing or calibration applied, $S_{corrected}(i,j)$ is the signal/raw pixel value with corrections applied, and $I_{gain}(i,j)$ is the gain map applied to $S_{raw}(i,j)$, and $I_{off}(i,j)$ is the offset map applied to $S_{raw}(i,j)$. In an aspect, after calibration according to the process 300, the gain map $I_{gain}$ is the gain map $I_{gainStd}$ determined at block 355 and the offset map $I_{off}$ is the offset map $I_{offset}$ determined at block 360. It is noted that, in some cases, the process 300 may be performed according to the blocks provided for a NUC pipeline in which gain is applied before offset is applied. In some cases, a different order of operations may be performed for a NUC pipeline in which offset is applied before gain.

In some embodiments, after the imaging device 105 performs a two-source calibration process, such as according to the process 300, the imaging device 105 may apply the various maps and parameters determined from the calibration to images captured by the imaging device 105 to implement non-uniformity correction. In some aspects, upon start-up of the imaging device 105 (e.g., the image capture component 120), the NUC maps (e.g., gain maps, offset maps, and/or bad pixel maps stored in non-volatile memory of or otherwise accessible to the imaging device 105) may be applied in an image processing pipeline until a calibration is performed to update the NUC maps.

In some embodiments, the imaging device 105 may be further calibrated (e.g., generally later in the field operation) using a single-source calibration process. A single-source calibration may be performed to update the NUC maps (e.g., gain maps and offset maps) determined during a two-source calibration. The single-source calibration may occur automatically (e.g., such as based on a time elapsed since a previous single-source calibration), upon user initiation, at start-up of the imaging device 105 and/or components thereof, due to a NUC table switch (e.g., based on detector temperature), and/or other triggering event dependent on application and/or user preference. Conventional calibration techniques may utilize images of a shutter or an external source and to adjust/update only offset terms. In some aspects, the imaging device 105 may allow the user to select whether to calibrate using the one-source calibration according to one or more embodiments herein or to calibrate using conventional techniques.

Figure 4:
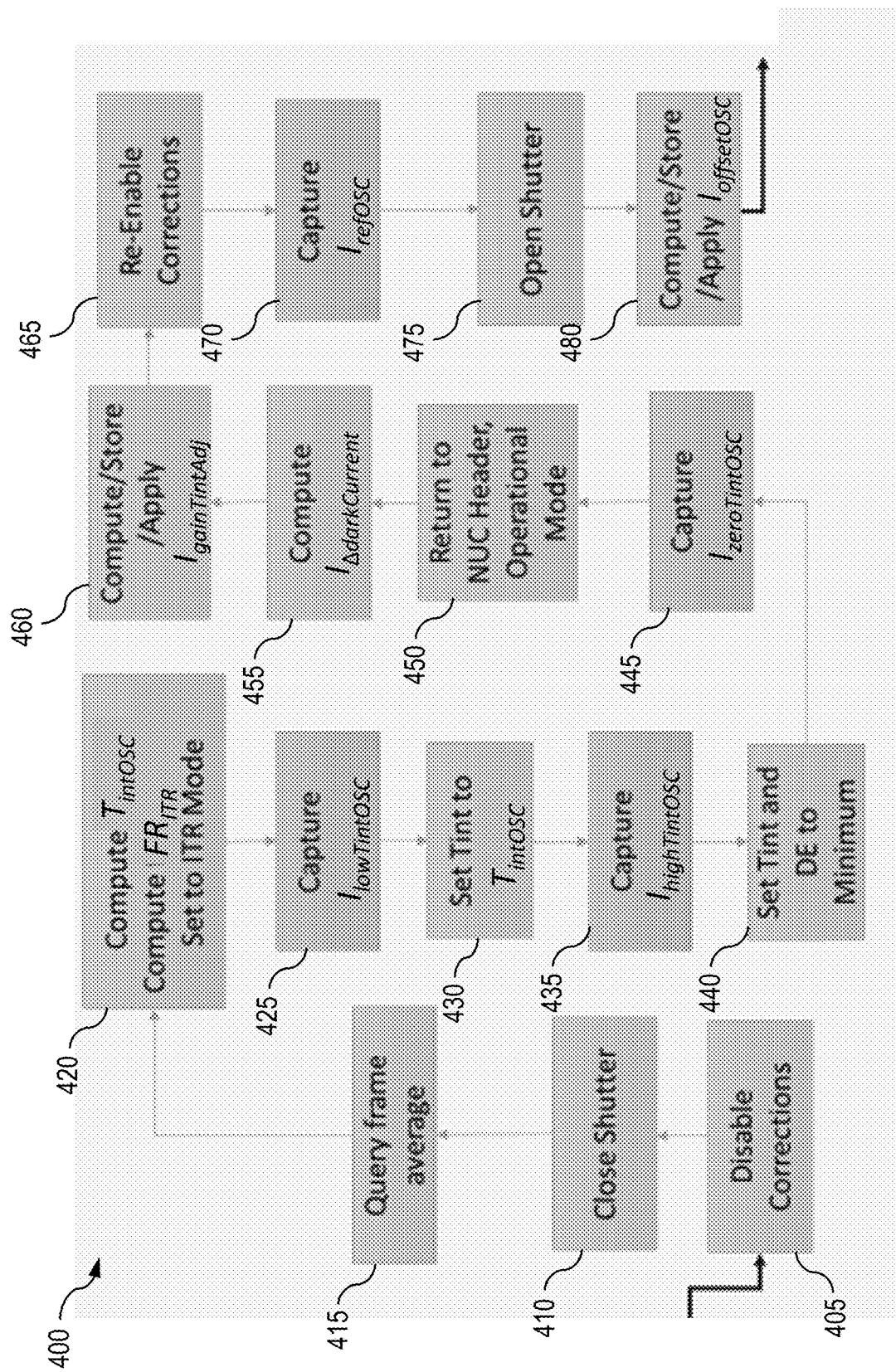
FIG. 4 illustrates a flow diagram of an example process for facilitating calibration using a single source in accordance with one or more embodiments of the present disclosure.

FIG. 4 illustrates a flow diagram of an example process 400 for facilitating calibration using a single source in accordance with one or more embodiments of the present disclosure. Although the process 400 is primarily described herein with reference to the imaging system 100 of FIG. 1 for explanatory purposes, the process 400 can be performed in relation to other systems for facilitating calibration. Note that one or more operations in FIG. 4 may be combined, omitted, and/or performed in a different order as desired. In some cases, the operations shown in FIG. 4 may be performed in the field. In some embodiments, the process 400 may be performed (e.g., to update NUC terms) at some time after a calibration (e.g., a factory calibration) has been performed by the imaging device 105 according to the process 300 and/or an in-the-field calibration has been performed by the imaging device 105.

At block 405, a calibration is initiated. With calibration initiated, non-uniformity corrections according to current NUC parameters may be disabled. In some cases, with calibration initiated, the imaging device 105 (e.g., the logic device 110) disables some or all processing performed by an image processing pipeline. In some cases, the logic device 110 may freeze (e.g., disable or stop updating) output of images (e.g., static images and/or video formed of a sequence of images) provided to the display component 135 and/or the network interface 145. In some embodiments, calibration may be initiated automatically (e.g., periodically and/or in response to one or more triggering events) by the logic device 110. In some embodiments, the calibration may be initiated by a user operating the control component 130 of the imaging device 105.

At block 410, a reference object (e.g., also referred to as a reference source) is positioned in the field of view of the imaging device 105 (e.g., the image detector circuit 165). The reference object may be at a known temperature (e.g., accurately measured and/or controllable temperature) and provide a uniform black body. In this regard, the reference object may be used as a single temperature source or substantially single temperature source. In some cases, the reference object may be a shutter of the imaging device 105 (e.g., an integrated shutter of the imaging device 105, such as the shutter 185) that is closed to block the image detector circuit 165. The logic device 110 may control an actuator to close the shutter or the user may manually close the shutter (e.g., by manually controlling the actuator or manually closing the shutter). In some cases, the reference source may be an object external to the image detector circuit 165 (e.g., to cover the entirety of the field of view of the image detector circuit 165). Such an external object may be referred to as, or referred to as providing, an external shutter. In some cases, the display component 135 of the imaging device 105 may prompt the user to confirm closing of the shutter over the image detector circuit 165.

At block 415, the imaging device 105 (e.g., the image capture component 120) captures a set of images (e.g., one or more thermal images) of the reference object and determines an average pixel value lowTintMean$_{OSC}$ (e.g., OSC to denote one-source calibration). The image(s) may be captured using the integration time value $T_{intCurrNUC}$ (e.g., provided in the current preset/NUC table stored in non-volatile memory). In a case that multiple images (e.g., a sequence of images) are captured, the imaging device 105 (e.g., the logic device 110) may generate an image $I_{refObj}$ by averaging some or all of the captured images. In a case that a single image of the reference object is captured, the single image is the image $I_{refObj}$. The image $I_{refObj}$ provides a temperature map associated with the reference object. The imaging device 105 (e.g., the logic device 110) may determine the average pixel value lowTintMean$_{OSC}$ by averaging the pixel values of the image $I_{refObj}$.

At block 420, the imaging device 105 (e.g., the logic device 110) determines an integration time $T_{intOSC}$. In some aspects, the integration time $T_{intOSC}$ may be based on the integration time value $T_{intCurrNUC}$ and parameters or maps determined and stored during the two-source calibration (e.g., such as provided by the process 300). In some cases, the integration time $T_{intOSC}$ may be provided by:

$$T_{intOSC} = T_{int\,CurrNUC} + T_{int\,CurrNUC} \frac{\text{high } T\,\text{Mean}_{TSC} - \text{low } T \text{ int Mean}_{OSC}}{\text{low } T \text{ int Mean}_{OSC} - \text{low Saturation Value}} \quad \text{Equation (3)}$$

where highTMean$_{TSC}$ may be determined during a two-source calibration (e.g., at block 315 of the process 300). In some cases, as shown in Equation (3), the integration time $T_{intCurrNUC}$ is scaled based on parameters determined using the high temperature source (e.g., highTMean$_{TSC}$) and the reference object (e.g., lowTintMean$_{OSC}$).

Further at block 420, the imaging device 105 (e.g., the logic device 110) determines a frame rate for the ITR mode, denoted as FR$_{ITR}$. In some cases, the frame rate FR$_{ITR}$ may be based on the integration time value $T_{intCurrNUC}$ relative to the integration time value $T_{intOSC}$. For example, the frame rate may be based in part on the longer/larger of the integration time $T_{intCurrNUC}$ or the integration time value $T_{intOSC}$.

Further at block 420, the imaging device 105 (e.g., the image capture component 120) is set to the ITR mode and the frame rate FR$_{ITR}$. In some cases, a current operational mode (e.g., characterized by a different integration mode such as IWR mode, different frame rate, different detector bias, sync mode, priority mode, and/or other parameters) may be stored for the imaging device 105 to revert back to the operational mode after subsequent calibration operations are completed.

At block 425, the imaging device 105 captures an image $I_{lowTintOSC}$ of the reference object according to (e.g., using) the integration time $T_{intCurrNUC}$ and the frame rate FR$_{ITR}$. The imaging device 105 may capture a set of images of the reference object according to (e.g., using) the integration time $T_{intCurrNUC}$ and the frame rate FR$_{ITR}$. In a case that multiple images (e.g., a sequence of images) are captured, the imaging device 105 (e.g., the logic device 110) may generate the image $I_{lowTintOSC}$ by averaging some or all of the captured images. In a case that a single image is captured, the single image is the image $I_{lowTintOSC}$.

At block 430, the imaging device 105 (e.g., the logic device 110) sets (e.g., changes) the integration time of the image capture component 120 to the integration time $T_{intOSC}$ (e.g., determined at block 420).

At block 435, the imaging device 105 captures an image $I_{highTintOSC}$ of the reference object according to the integration time $T_{intOSC}$ and the frame rate FR$_{ITR}$. The imaging device 105 may capture a set of images of the reference object according to the integration time $T_{intOSC}$ and the frame rate FR$_{ITR}$. In a case that multiple images (e.g., a sequence of images) are captured, the imaging device 105 may generate the image $I_{highTintOSC}$ by averaging some or all of the captured images. In a case that a single image is captured, the single image is the image $I_{highTintOSC}$.

At block 440, the imaging device 105 (e.g., the logic device 110) sets the integration time of the image capture component 120 to a low integration time $T_{intM}$ and the detector bias to a low detector bias. The integration time $T_{intM}$ is lower than the integration times $T_{intCurrNUC}$ and $T_{intOSC}$. Such settings may allow determination of characteristics/parameters relating to dark current associated with the image capture component 120, as further described herein. In some aspects, the integration time $T_{intM}$ may be at or around (e.g., slightly above) a minimum integration time $T_{intMIN}$ achievable by the image capture component 120. In some implementations, the minimum integration time may be sub-millisecond in duration. In some aspects, the detector bias may be at or around (e.g., slightly above) a minimum detector bias associated with operating the image capture component 120. For example, the detector bias may have a minimum value of zero counts.

At block 445, the imaging device 105 captures an image $I_{zeroTintOSC}$ of the reference object according to the integration time $T_{intM}$ and the frame rate FR$_{ITR}$. The imaging device 105 (e.g., the image capture component 120) may capture one or more images of the reference object according to the integration time $T_{intM}$ and the frame rate FR$_{ITR}$. In a case that multiple images (e.g., a sequence of images) are captured, the imaging device 105 (e.g., the logic device 110) may generate the image $I_{zeroTintOSC}$ by averaging some or all of the captured images. In a case that a single image is captured, the single image is the image $I_{zeroTintOSC}$.

At block 450, the imaging device 105 reverts (e.g., is returned/restored) to the operational mode (e.g., sync, frame rate, integration/readout priority, preset integration time, detector bias) and NUC header parameters (e.g., stored at or prior to block 420) to return the imaging device 105 to settings used prior to block 425.

At block 455, the imaging device 105 (e.g., the logic device 110) determines a dark current image $I_{\Delta darkCurrent}$ (e.g., also referred to as a dark current map or dark current correction map/image) associated with the image capture component 120. In some aspects, the dark current image $I_{\Delta darkCurrent}$ is based on parameters and/or maps determined and stored (e.g., in non-volatile memory) during the two-source calibration and parameters and/or maps determined and stored (e.g., in volatile memory) as part of the one-source calibration prior to block 455. The dark current image $I_{\Delta darkCurrent}$ may be based on one or more temperature maps and/or statistics (e.g., averages) derived from the temperature map(s). These temperature maps may be of the same or different temperature sources and/or captured using the same or different integration times. By way of non-limiting examples, the dark current image $I_{\Delta darkCurrent}$ may be based on one or more temperature maps associated with a two-source calibration's high temperature source (e.g., $I_{highT}$), one or more temperature maps associated with a two-source calibration's low temperature source (e.g., $I_{lowT}$, $I_{lowTintTSC}$, and/or $I_{highTintTSC}$), and/or one or more temperature maps associated with a single-source calibration's reference source (e.g., $I_{zeroTintOSC}$). In some cases, each pixel (i,j) of the dark current map $I_{\Delta darkCurrent}$ may be determined as follows:

$$I_{\Delta dark Current}(i, j) = [I_{high\,T\,int\,Scaled\,TSC}(i, j) - I_{low\,T\,int\,TSC}(i, j)]$$

$$- \frac{\text{mean}(I_{high\,T\,int\,Scaled\,TSC}(i, j) - I_{low\,T\,int\,TSC}(i, j))}{\text{mean}(I_{high\,T}(i, j) - I_{low\,T}(i, j))}$$

$$[I_{high\,T}(i, j) - I_{low\,T}(i, j)]$$

$$= [I_{high\,T\,int\,Scaled\,TSC}(i, j) - I_{low\,T\,int\,TSC}(i, j)]$$

$$- \frac{\text{mean}(I_{high\,T\,int\,Scaled\,TSC}(i, j) - I_{low\,T\,int\,TSC}(i, j))}{I_{gain\,Std}(i, j)}$$

Equation (4)

where $$I_{high\,T\,int\,Scaled\,TSC}(i, j) = \frac{T_{intOSC}}{T_{int\,TSC}} I_{high\,T\,int\,TSC}(i, j) + \frac{T_{int\,TSC} - T_{intOSC}}{T_{int\,TSC}} I_{zero\,T\,int\,OSC}(i, j)$$

Equation (5)

At block 460, the imaging device 105 (e.g., the logic device 110) determines a gain map $I_{gainTintAdj}$ formed of pixels $I_{gainTintAdj}(i,j)$ in which $0 \leq i \leq M-1$ and $0 \leq j \leq N-1$. The gain map may be stored (e.g., in volatile-memory) for use as part of NUC. The gain map $I_{gainTintAdj}$ may be determined based on the dark current image $I_{\Delta darkCurrent}$ and other parameters and/or maps determined and stored (e.g., in volatile memory) as part of the one-source calibration prior to block 455. By way of non-limiting examples, the gain map $I_{gainTintAdj}$ may be based on the dark current image $I_{\Delta darkCurrent}$ and one or more temperature maps associated with a single-source calibration's reference source (e.g., $I_{lowTintOSC}$). In some cases, the gain map may be provided by:

At block 465, the imaging device 105 (e.g., the logic device 110) enables correction (e.g., NUC) of captured images.

At block 470, the imaging device 105 captures an image $I_{refOSC}$ according to the integration time $T_{intCurrNUC}$. The image $I_{refOSC}$ is an image with the gain map $I_{gainTintAdj}$ applied. The imaging device 105 (e.g., the image capture component 120) may capture a set of images of the reference object according to (e.g., using) the integration time $T_{intCurrNUC}$. In a case that multiple images (e.g., a sequence of images) are captured, the imaging device 105 (e.g., the logic device 110) may generate the image $I_{refOSC}$ by averaging some or all of the captured images. In a case that a single image is captured, the single image is the image $I_{refOSC}$.

At block 475, the reference object is removed from the field of view of the imaging device 105 (e.g., the image detector circuit 165) to allow the image detector circuit 165 to be exposed to the scene 175. When the reference object is a shutter (e.g., the shutter 185), the shutter is opened to allow the image detector circuit 165 to be exposed to the scene 175.

At block 480, the imaging device 105 (e.g., the logic device 110) determines an offset map $I_{offsetOSC}$ based on the image $I_{refOSC}$, which has the new gain map $I_{gainTintAdj}$ applied. The offset map may be stored (e.g., in volatile-memory) for use as part of NUC. In some cases, the calibration (e.g., single-source calibration) is concluded. The gain map $I_{gainTintAdj}$ and the offset map $I_{offsetOSC}$ may be used for NUC of images captured by the imaging device 105.

Thus, following block 480, the imaging device 105 may be used to capture (e.g., may return to capturing) images of the scene 175 and apply the new gain map $I_{gainTintAdj}$ and offset map $I_{offsetOSC}$ obtained from the one-source calibration to the captured images for non-uniformity correction, such as according to Equation (2). It is noted that, in some cases, the process 400 may be performed according to the blocks provided for a NUC pipeline in which gain is applied before offset is applied. In some cases, a different order of operations may be performed for a NUC pipeline in which offset is applied before gain. In some aspects, subsequent calibrations, such as a subsequent calibration according to the $$I_{gain\,T\,int\,Adj}(i, j) = \frac{\text{mean}\,[(I_{high\,T\,intOSC}(i, j) - I_{\Delta dark\,Current}(i, j) - I_{low\,T\,int\,TSC}(i, j)]}{(I_{high\,T\,intOSC}(i, j) - I_{\Delta dark\,Current}(i, j)) - I_{low\,T\,int\,TSC}(i, j)}$$

Equation (6)

process 400, may be performed to replace and/or update the new gain map $I_{gainTintAdj}$ and/or offset map $I_{offsetOSC}$ to allow/maintain effective NUC (e.g., fixed pattern noise reduction) over time.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   capturing, by an imager of an imaging device, a first set of infrared images of a reference object using a first integration time;
   capturing, by the imager, a second set of infrared images of the reference object using a second integration time different from the first integration time;
   obtaining, from a memory of the imaging device, first and second image data associated with a two-source calibration of the imaging device, wherein the first image data is associated with a first reference source associated with a first temperature, and wherein the second image data is associated with a second reference source associated with a second temperature different from the first temperature;
   determining a dark current correction map based on the second set of infrared images, the first image data, and the second image data; and
   generating a non-uniformity correction map based on the dark current correction map.

2. The method of claim 1, wherein the dark current correction map is further based on the first integration time, and wherein the non-uniformity correction map is further based on the first set of infrared images.

3. The method of claim 1, further comprising capturing, by the imager, a third set of infrared images of the reference object using a third integration time, wherein the non-uniformity correction map is further based on the third set of infrared images.

4. The method of claim 3, further comprising:
   capturing, by the imager, a fourth set of infrared images of the reference object using the third integration time; and
   determining the first integration time based on the third integration time and the fourth set of infrared images.

5. A method comprising:
   capturing, by an imager of an imaging device, a first set of infrared images of a reference object using a first integration time;
   capturing, by the imager, a second set of infrared images of the reference object using a second integration time different from the first integration time;
   capturing, by the imager, a third set of infrared images of the reference object using a third integration time;
   capturing, by the imager, a fourth set of infrared images of the reference object using the third integration time;
   determining the first integration time based on the third integration time and the fourth set of infrared images;
   determining a dark current correction map based on the second set of infrared images;
   generating a non-uniformity correction map based on the dark current correction map and the third set of infrared images; and
   determining a frame rate based on the first integration time and/or the third integration time, wherein the first, second, and third sets of images are captured according to the frame rate, and wherein the second integration time is lower than the first integration time and the third integration time.

6. The method of claim 5, wherein the frame rate is based on a longer of the first integration time or the third integration time.

7. The method of claim 1, further comprising obtaining, from the memory, third image data and the first integration time, wherein the third image data is associated with the second reference source and the first integration time, and wherein the dark current correction map is further based on the third image data and the first integration time.

8. The method of claim 7, wherein the second temperature is lower than the first temperature.

9. The method of claim 1, further comprising generating an offset map based on the dark current correction map, wherein the non-uniformity correction map comprises a gain map.

10. The method of claim 1, further comprising initiating a run-time calibration of the imager, wherein the run-time calibration comprises the capturing the first set, the capturing the second set, the determining, and the generating.

11. The method of claim 1, wherein the reference object is a shutter of the imaging device.

12. An infrared imaging system comprising:
    an infrared imager configured to:
      capture a first set of infrared images of a reference object using a first integration time;
      capture a second set of infrared images of the reference object using a second integration time different from the first integration time; and
      capture a third set of infrared images using a third integration time; and
    a logic device configured to:
      determine a frame rate based on the first integration time and/or the third integration time, wherein the first set, second set, and/or third set of images are captured according to the frame rate;
      determine a dark current correction map based on the second set of infrared images; and generate a non-uniformity correction map based on the dark current correction map and the third set of images.

13. The infrared imaging system of claim 12, wherein:
the infrared imager is further configured to capture a fourth set of infrared images of the reference object using the third integration time; and
the logic device is further configured to determine the first integration time based on the third integration time and the fourth set of infrared images.

14. The infrared imaging system of claim 13, wherein the second integration time is lower than the first integration time and the third integration time.

15. The infrared imaging system of claim 12, further comprising a memory configured to store calibration data associated with a two-source calibration, wherein the calibration data comprises first image data associated with a first source associated with a first temperature and second image data associated with a second source associated with a second temperature different from the first temperature, wherein the dark current correction map is further based on the first image data and the second image data.

16. The infrared imaging system of claim 15, wherein the calibration data further comprises third image data and the first integration time, wherein the third image data is associated with the second source and the third integration time, and wherein the dark current correction map is further based on the third image data and the first integration time.

17. The infrared imaging system of claim 16, wherein the second temperature is lower than the first temperature.

18. The infrared imaging system of claim 12, wherein the reference object is a shutter of the imaging system.

19. The infrared imaging system of claim 12, wherein the frame rate is based on a longer of the first integration time or the third integration time.

20. The infrared imaging system of claim 12, wherein the logic device is further configured to determine the first integration time based on the third integration time.

* * * * *